KINESCOPE RESIDUAL BEAM EXTINCTION CIRCUIT

Filed June 18, 1952

INVENTORS.
ROBERT J. SCHIPPER
ROBERT A. STACY
BY Alden D. Redfield
Norman J. O'Malley
ATTORNEYS.

Patented May 12, 1953 2,638,562

UNITED STATES PATENT OFFICE 2,638,562

KINESCOPE RESIDUAL BEAM EXTINCTION CIRCUIT

Robert J. Schipper, Fort Mitchell, Ky., and Robert A. Stacy, Cincinnati, Ohio, assignors to Avco Manufacturing Corporation, Cincinnati, Ohio, a corporation of Delaware Application June 18, 1952, Serial No. 294,238

4 Claims. (Cl. 315—20)

Figure 1:
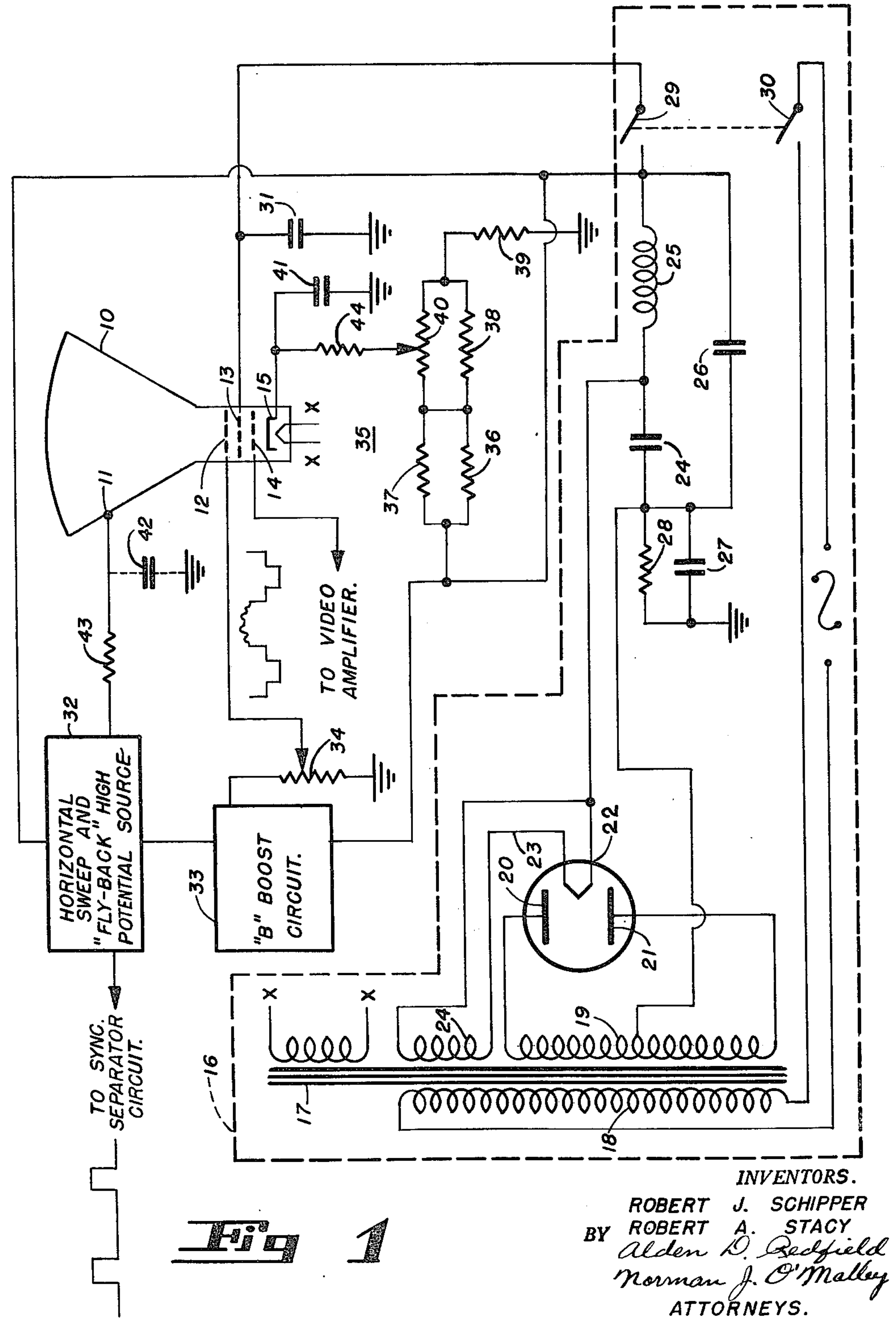

The screen of a television receiver kinescope or picture tube is extremely sensitive to extended stationary and concentrated beam bombardment by either electrons or negative ions. Burning or destruction of the screen phosphor can be caused by either. Negative ions, because of their greater mass, everything else being equal, naturally cause more damage than electrons.

Ion bombardment in electrostatically deflected kinescopes is relatively unimportant as long as the beam is being deflected. In this type of kinescope both the negative ions and electrons are deflected to the same extent. However, ion bombardment in electromagnetically deflected kinescopes has caused trouble because the deflection field has little if any effect on the ion stream and allows it to bombard the center of the phosphor screen. This has been overcome, for all practical purposes, in conventional circuits by several different methods, e. g., by aiming the cathode ray beam toward the neck wall of the kinescope through a steady transverse magnetic field which brings the electron beam back into its proper path, allowing the negative ions to be dissipated in the neck of the kinescope without striking the screen.

When a television receiver is functioning properly the electron beam is deflected evenly over the screen surface and not allowed to remain focused on any one spot for a period of time long enough to cause screen burning. However, immediately after being turned off most receivers, because of inherent decay time constants in connecting circuitry, maintain a residual electron beam in the kinescope, undeflected and generally focused on the center of the screen surface. In electromagnetically focused kinescope circuits, the focus field disappears rapidly and screen burn is minimized because the residual beam current dissipates itself over a fairly large area. However in electrostatically focused kinescopes and kinescopes using a permanent magnet type of focusing device the deflected residual electron beam is more sharply focused on a small spot in the center of the screen and serious screen burns result if the beam remains concentrated for too long a period.

Therefore it is an object of the present invention to provide means for rapid extinction of the kinescope residual electron beam when the television receiver is turned off.

It is also an object of the invention to provide a kinescope residual beam current extinction circuit which does not interfere with normal receiver circuit operation.

It is a further object of the invention to provide circuitry for maintaining a television receiver kinescope in a highly conductive condition after the receiver has been turned off so as to rapidly dissipate kinescope residual electron beam current and minimize center screen burning.

Briefly, the invention comprises circuit means for causing the first anode voltage to decay more slowly than the voltage on the other elements of the television receiver kinescope. Thus, the cathode ray tube or kinescope remains highly conductive; the residual electron beam current is rapidly dissipated to reach a point of visual extinction within a very few seconds, and well before the screen phosphor is damaged.

These functions are accomplished in the disclosed embodiment through the use of a switch in the first anode potential connection which disconnects the first anode from its power supply simultaneously with the opening of the on-off receiver switch. Potential is maintained on the first anode of the kinescope by a capacitor having no discharge path other than through the high resistance of the open first anode potential switch, the internal kinescope leakage resistance and its own inherent leakage resistance. The capacitance value of the capacitor is selected so as to form a decay time constant with these various leakage resistances which is slow enough to maintain sufficient first anode potential to rapidly discharge the second anode circuit beyond the point where the kinescope beam is strong enough to visually excite the phosphorous screen surface.

For a better understanding of the present invention, together with other and further objects, advantages and capabilities thereof, reference is made to the following disclosure in connection with the accompanying drawing.

The single drawing discloses a specific embodiment of the invention as utilized in an electrostatically focused kinescope circuit.

In this specific embodiment there is shown a kinescope 10 having a second anode connection 11, a focusing electrode 12, a first anode 13, a control grid 14 and a cathode 15. The receiver low voltage power source is shown in dashed outline 16 and includes a transformer 17 having a primary winding 18 fed from any conventional A. C. power source, e. g., 115 volts, 60 cycles A. C. The transformer also has a secondary winding 19 having two end taps which are connected to the anodes 20 and 21 of rectifier 22 and a center tap which acts as a rectifier output terminal. Rectifier cathode 23 which is heated by filament winding 24 forms the second output terminal of the rectifier. Filter capacitor 24 is connected across the rectifier output and to inductor 25 which may be the field coil of a speaker in the television receiver audio system. Filter capacitors 26 and 27 along with resistor 28 form the remainder of the rectifier filter circuit, resistor 28 being connected in parallel with capacitor 27 between the center tap of secondary winding 19 and ground. Potential is supplied to first anode 13 through a single pole, single throw switch 29 which is mechanically ganged to operate along with the receiver on-off switch 30. A capacitor 31 is connected between the first anode and ground for holding potential on first anode 13 after switches 29 and 30 are opened, as will hereinafter be more exhaustively explained.

The horizontal sweep circuit including a "flyback" high potential source is diagrammatically shown in block form at 32. A conventional B boost circuit is indicated diagrammatically in block form at 33 for supplying B+ potential to focus control 34 and the horizontal sweep circuit 32. Brightness control 35 which is supplied from low voltage power source 16, specifically comprises resistors 36, 37, 38, and 39 along with rheostat 40. The movable tap of rheostat 40 is connected through resistor 44 to kinescope cathode 15 for raising or lowering the bias voltage on the cathode, thus controlling the brightness level of the resulting picture. Capacitor 41 which is connected between kinescope cathode 15 and ground is a conventional by-pass capacitor.

The horizontal sweep circuit portion of block 32 is supplied with a source of synchronizing signals conventionally taken from a sync separator circuit, the showing of which is not deemed necessary for explanation of the present invention. Kinescope control grid 14 is supplied from a source of composite video signals, e. g., the video amplifier, also not shown.

Potential is supplied to second anode 11 through a series resistor 43. Capacitor 42, which may either be the inherent capacitance to ground of the kinescope inner aquadag coating or an actual capacitor connected externally to the kinescope, acts as a filter capacitor during circuit operation.

The B boost circuit 33 which supplies potential to focusing electrode 12 and the horizontal sweep circuit 32 is supplied with power from low voltage source 16 and as a result of the capacitors conventionally involved in these circuits, potentials on the focus control circuit and the B boost circuit do not disappear immediately when the receiver is turned off, they decay over a given time constant period.

Considering operation of the circuit, first assume that the receiver is turned on and functioning in conventional manner. On-off switch 30 is closed connecting the primary winding 18 of transformer 17 in the low voltage supply source to a source of alternating current. Switch 29 which is ganged to switch 30 so as to open and close simultaneously therewith, is in closed position connecting first anode 13 to low voltage source 16. Capacitor 31 which is connected between first anode 13 and ground is charged by the connected potential supply and the capacitor plate which is connected to first anode 13 assumes the same potential as anode 13 relative to the ground. Capacitor 42 in the high potential second anode circuit is charged by the high potential supply source and the capacitor plate which is connected to second anode 11 assumes the potential of this kinescope electrode.

When switch 30 is opened to disconnect the low voltage transformer primary 18 from its source of A. C. voltage, first anode supply switch 29 is also opened simultaneously therewith through the previously mentioned mechanical ganging arrangement. As has been stated, the potential on the various kinescope electrodes do not immediately discharge when the receiver is turned off but instead decay along given time voltage curves as governed by the various resistance-capacitance time constant networks in their connected circuitry. Thus the potential on second anode 11 decays in accordance with the time constant of the discharge path of capacitor 42 and the potentials on focus electrode 12 and cathode 15 likewise decay along given time voltage curves.

In conventional receivers not using the present invention, the first anode potential decays more rapidly than the second anode potential. This has the effect of weakening the residual electron beam inside of the kinescope but it also has the effect of lengthening the time during which the residual beam flows. As can be seen from the drawing, second anode potential will remain on the kinescope until capacitor 42 is discharged beyond the point where it supplies sufficient potential to attract electrons from the cathode. Since capacitor 42 is discharged at least in part by the residual electron beam, a diminishing of the strength of this beam, i. e., a decrease in the conductivity of the kinescope, decreases the number of electrons flowing in a given time period toward the second anode plate of the capacitor. It follows that the fewer the number of electrons flowing in the residual beam, the longer it takes for capacitor 42 to discharge. The decay time of the capacitor is therefore lengthened.

This residual electron beam even though weakened causes screen burning if allowed to remain focused on the screen for a given period of time as governed by the dissipation rating of the screen phosphor in question. Different phosphors have different beam dissipation ratings, e. g., present day kinescopes use phosphors which are rated to absorb a screen dissipation of approximately 1½ milliwatts per square centimeter for 10 seconds without suffering from screen burn. Thus it can be seen that time is a very important factor in the rating and it follows that intermittent beam dissipation of higher wattage can be absorbed by the phosphors without ill effect over shorter periods of time. It also follows that beam dissipations of lower wattage will cause screen burn if the period of bombardment is extended sufficiently.

This invention takes advantage of the time factor of screen dissipation by greatly reducing the dissipation period and relatively increasing beam electron current. When switch 29 is opened simultaneously with the opening of on-off switch 30, first anode potential is maintained by the charge on capacitor 31. As can be seen in the drawing, this capacitor can only discharge through the open resistance of switch 29 and the inherent leakage resistance between first anode 13 and ground; so by selecting a capacitance value suitable for forming a resistance-capacitance time constant circuit with a decay time which is slower than the decay time of the second anode circuit, the kinescope is forced to remain in a highly conductive condition after the on-off switch is opened.

As has been stated, the residual beam will continue to flow, at least until the charge on capacitor 42 is dissipated beyond the point where it will supply sufficient second anode potential to draw electrons to the screen surface. A given number of electrons will discharge capacitor 42 whether they flow to the second anode plate of the capacitor over a long period of time or over a short period of time. However, as has been stated, time is an important factor in avoiding screen burn and the screen phosphors will take a relatively heavy beam current for short periods of time without noticeable ill effect. Thus, it follows that by keeping the kinescope in a highly conductive state capacitor 42 can be quickly discharged to stop electron beam bombardment of the screen.

True, the screen does receive a relatively heavy beam current at the instant the receiver is turned off, however, in conventional electromagnetically deflected types a large portion of this current will be deflected over the entire screen surface because of the momentary retention of deflection field. Even if capacitor 42 is not discharged before the deflection field collapses, it has been found that residual beam bombardment of the screen is stopped well-within the safe time period.

Conventional electrostatically focused and permanent magnet focused units lacking the present invention have been known to hold a sharply focused residual electron beam on the kinescope screen for as high as four or five minutes after the receiver is turned off. With an embodiment of the present invention included in the same circuit the residual electron beam passes the visual extinction point in a few seconds, well-within the same screen dissipation period.

While I do not desire to be limited to any specific circuit parameters, such parameters varying in accordance with the requirements of individual designs, the following circuit values have been found entirely satisfactory in the specific and successful illustrated embodiment of the invention;

| | | |
|---|---|---|
| Resistor 28 | ohms | 27 |
| Resistor 34 | megohms | 1.5 |
| Resistor 36 | ohms | 47,000 |
| Resistor 37 | do | 39,000 |
| Resistor 38 | do | 6,800 |
| Resistor 39 | do | 2,200 |
| Resistor 40 | do | 40,000 |
| Resistor 43 | megohm | 1 |
| Resistor 44 | ohms | 47,000 |
| Capacitor 24 | mfd | 40 |
| Capacitor 26 | mfd | 40 |
| Capacitor 27 | mfd | 500 |
| Capacitor 31 | mfd | .01 |
| Capacitor 41 | mfd | .08 |
| Capacitor 42 | mfd | 500 |

While the specific embodiment which has been shown and described is at present considered the preferred embodiment of the invention, it will be obvious to those skilled in the art that various changes and modifications may be made therein without departing from the scope of the appended claims.

Having thus described our invention, we claim:

1. In a television receiver the combination comprising a kinescope having a second anode circuit including a resistance-capacitance network having a given decay time constant, a first anode, a control grid circuit and a cathode circuit; a potential source; a receiver on-off switch; a switch means ganged to open and close with said on-off switch; said switch means being connected between said first anode and said potential source; and a capacitor connected between said first anode and a potential point common to said potential source and said control grid and cathode circuits to form a circuit having a decay time constant which is longer than the given decay time constant in said second anode circuit.

2. In a television receiver the combination comprising a power source including an on-off switch for energizing and deenergizing said power source; a kinescope having a first anode, a second anode, a control grid circuit and a cathode circuit; a second anode potential source energized by said power source; means coupling said second anode to said second anode potential source to form a circuit having a decay time constant which maintains potential on said second anode after the power source is deenergized by said on-off switch; a switch means ganged to said on-off switch which opens when said on-off switch is in the off position and which closes when said on-off switch is in the on position, said switch means having a given open resistance value; means connecting said switch means between said power source and said first anode; and a capacitor having a given capacitance value connected between said first anode and a potential point common to said power source, said control grid circuit and said cathode circuit, the product of said given capacitance value and the open resistance value of said switch means being greater than the decay time constant of the second anode circuit.

3. In a television receiver the combination comprising an on-off switch for energizing the receiver potential sources; a kinescope having a first anode and a second anode and first and second anode potential sources; means coupling said second anode to said second anode potential source to form a circuit having a decay time constant which maintains potential on said second anode after the receiver on-off switch is turned to the off position, a switch means ganged to said on-off switch which opens when said on-off switch is in the off position and which closes when said on-off switch is in the on position; means connecting said switch means between said first anode potential source and said first anode; and a capacitor having a given capacitance value connected between said first anode and an equipotential point common to said potential sources, the product of the given capacitance value of said capacitor and the resistance value of the resistance across said capacitor when said switch means is open being greater than the decay time constant of the second anode circuit.

4. In a television receiver the combination comprising a power source including an on-off switch for energizing and deenergizing said power source; a kinescope having a first anode and a second anode, a second anode potential source energized by said power source; resistance-capacitance means coupling said second anode to said second anode potential source to form a circuit having a decay time constant which maintains potential on said second anode after the power source is deenergized by said on-off switch; a switch means ganged to said on-off switch which opens when said on-off switch is in the off position and which closes when said on-off switch is in the on position; means connecting said switch means between said power source and said first anode; and a capacitor having a given capacitance value connected between said first anode and a potential point common to said power source, the product of the given capacitance value of said capacitor and the resistance across said capacitor when said switch means is opened being greater than the decay time constant of the said resistance-capacitance means in the second anode circuit.

ROBERT J. SCHIPPER.
ROBERT A. STACY.

References Cited in the file of this patent

UNITED STATES PATENTS

| Number | Name | Date |
|---|---|---|
| 2,169,831 | Cawein | Aug. 15, 1939 |
| 2,248,815 | Deserno | July 8, 1941 |
| 2,280,670 | Spielman | Apr. 21, 1942 |
| 2,313,967 | Read | Mar. 16, 1943 |
| 2,588,652 | Nelson | Mar. 11, 1952 |